US011310560B2

(12) United States Patent
Lim

(10) Patent No.: US 11,310,560 B2
(45) Date of Patent: Apr. 19, 2022

(54) BITSTREAM MERGER AND EXTRACTOR

(71) Applicant: Samsung Electronics Co., Ltd., Suwon-si (KR)

(72) Inventor: Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/929,631

(22) Filed: May 13, 2020

(65) Prior Publication Data

US 2020/0366962 A1 Nov. 19, 2020

Related U.S. Application Data

(60) Provisional application No. 62/849,203, filed on May 17, 2019, provisional application No. 62/871,022, filed on Jul. 5, 2019.

(51) Int. Cl.
*H04N 21/4728* (2011.01)
*H04N 21/434* (2011.01)
*H04N 21/44* (2011.01)

(52) U.S. Cl.
CPC ....... *H04N 21/4728* (2013.01); *H04N 21/434* (2013.01); *H04N 21/44008* (2013.01); *H04N 21/44012* (2013.01)

(58) Field of Classification Search
CPC ............. H04N 21/4728; H04N 21/434; H04N 21/44012; H04N 21/44008
See application file for complete search history.

(56) References Cited

U.S. PATENT DOCUMENTS

| 10,595,026 | B2 | 3/2020 | Kang et al. | |
|---|---|---|---|---|
| 10,743,000 | B2 | 8/2020 | Lim et al. | |
| 2015/0382002 | A1 | 12/2015 | Park et al. | |
| 2016/0105688 | A1* | 4/2016 | Hendry | H04N 19/597 |
| | | | | 375/240.25 |
| 2016/0212437 | A1 | 7/2016 | Tsukuba et al. | |
| 2018/0295400 | A1 | 10/2018 | Thomas et al. | |
| 2019/0075307 | A1 | 3/2019 | Hattori | |

(Continued)

FOREIGN PATENT DOCUMENTS

| KR | 10-1904258 B1 | 9/2018 |
|---|---|---|
| WO | 2018/004317 A1 | 1/2018 |

OTHER PUBLICATIONS

"Draft Requirements for Immersive Media Access and Delivery", ISO/IEC JTC1/SC29/WG11, N18357, Mar. 2019, 18 pages.

(Continued)

*Primary Examiner* — Alazar Tilahun

(57) ABSTRACT

Methods and apparatuses for extracting and merging bitstreams. An apparatus includes a communication interface and a processor. The communication interface receives a plurality of bitstreams for a video and a processor. The processor identifies information about independently coded regions in each of the plurality of bitstreams, receives a region of interest in the video, selects, based on the identified information, one or more independently coded regions in each of the plurality of bitstreams that corresponds to the region of interest, and extracts the selected independently coded regions to generate one or more extracted bitstreams.

20 Claims, 12 Drawing Sheets

(56) References Cited

U.S. PATENT DOCUMENTS

2019/0208234 A1* 7/2019 Van Brandenburg ........................ H04N 21/234345
2019/0238860 A1* 8/2019 Lim ................. H04N 21/23439

OTHER PUBLICATIONS

"MPEG-I Architectures", ISO/IEC JTC1/SC29/WG11, N18344, Mar. 2019, 14 pages.
"Working Draft 5 of Versatile Video Coding", ISO/IEC JTC1/SC29/WG11, N18370, Mar. 2019, 406 pages.
"Requirements for Immersive Media Access and Delivery", ISO/IEC JTC1/SC29/WG11, N18654, Jul. 2019, 20 pages.
"Thoughts on Immersive Media Decoding Interface for VVC", ISO/IEC JTC1/SC29/WG11, N18615, Jul. 2019, 14 pages.
International Search Report and Written Opinion of the International Searching Authority in connection with International Patent Application No. PCT/KR2020/006447 dated Sep. 3, 2020, 8 pages.

* cited by examiner

BITSTREAM MERGER AND EXTRACTOR

CROSS-REFERENCE TO RELATED APPLICATIONS AND CLAIM OF PRIORITY

This application claims priority to U.S. Provisional Patent Application No. 62/849,203 filed May 17, 2019 and U.S. Provisional Patent Application No. 62/871,022 filed Jul. 5, 2019, the disclosures of which are incorporated herein by reference in their entireties.

TECHNICAL FIELD

The present disclosure relates to wireless communication systems. More particularly, the present disclosure relates to data streams in immersive media applications.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds, can be used in the immersive environment.

Advances in 3D technologies have spurred a new wave of innovation in the creation, transmission, and rendering of Virtual Reality (VR) Augmented Reality (AR), and Mixed Reality (MR). Point clouds meshes are common in a variety of applications such as gaming, 3D maps, visualizations, medical applications, augmented reality, virtual reality, autonomous driving, multi-view replay, 6 degrees of freedom (DoF) immersive media, to name a few. However, decoding three-dimensional objects can present constraints.

SUMMARY

The present disclosure relates to a bitstream merger and extractor to enhance the decoding and decryption of video files.

In one embodiment, an apparatus includes a communication interface and a processor. The communication interface receives a plurality of bitstreams for a video and a processor. The processor identifies information about independently coded regions in each of the plurality of bitstreams, receives a region of interest in the video, selects, based on the identified information, one or more independently coded regions in each of the plurality of bitstreams that corresponds to the region of interest, and extracts the selected independently coded regions to generate one or more extracted bitstreams.

In another embodiment, a method comprises receiving a plurality of bitstreams for a video, identifying information about independently coded regions in each of the plurality of bitstreams, receiving a region of interest in the video based on the identified information about the independently coded regions, selecting, based on the identified information, one or more independently coded regions in each of the plurality of bitstreams that corresponds to the region of interest, and extracting the selected independently coded regions to generate one or more extracted bitstreams.

In yet another embodiment, an apparatus includes a processor and a communication interface. The processor independently encodes regions of a video in each of a plurality of bitstreams for the video and includes information about the independently encoded regions in one or more network abstract layer (NAL) units in the plurality of bitstreams. The information about the independently encoded regions includes information about a size of each of the independently encoded regions and a location of each of the independently encoded regions within the video. The communication interface transmits the plurality of bitstreams.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
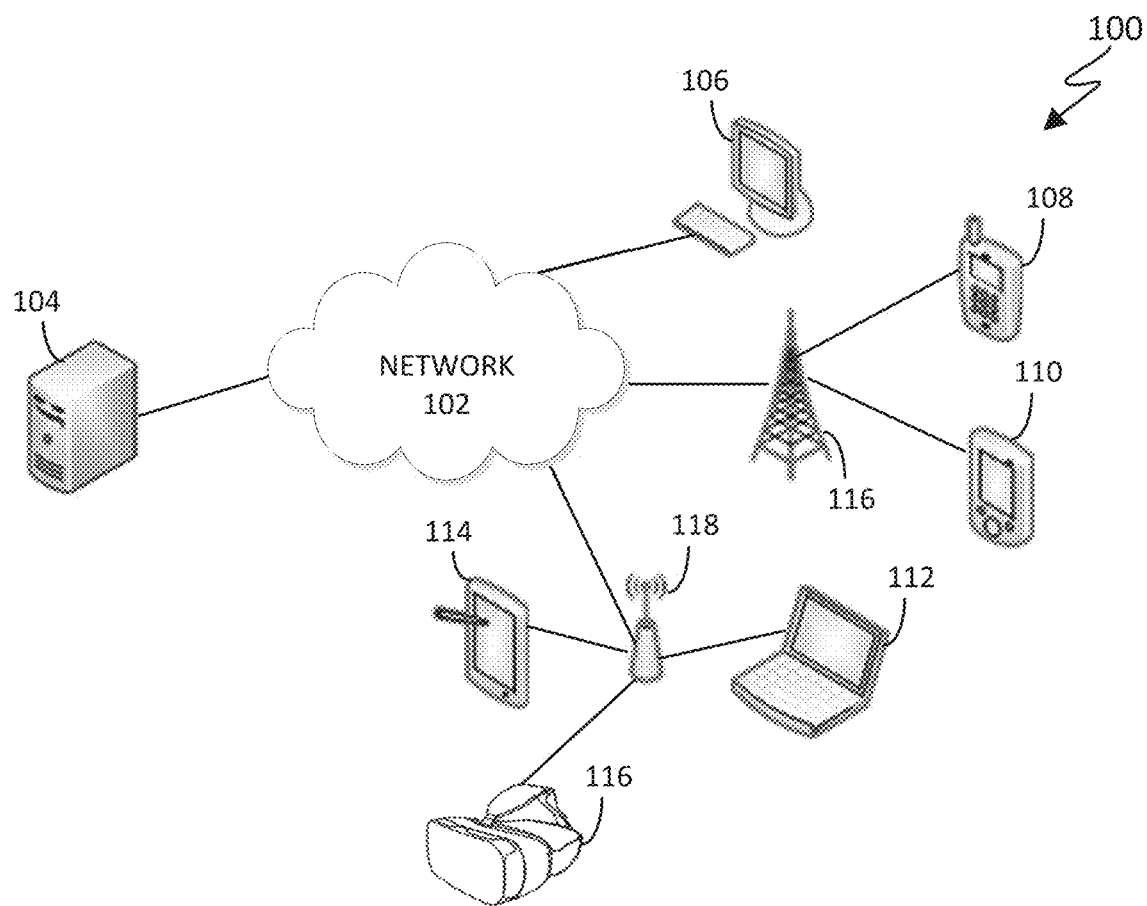
FIG. 1 illustrates an example communication system in accordance with an embodiment of this disclosure.

FIGS. 1 through 13 discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

Augmented reality (AR) is an interactive experience of a real-world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). A HMD represents one of many types of devices that provide AR and VR experiences to a user. A HMD is a device that enables a user to view the VR scene and adjust the displayed content based on movements of the head of the user. Typically, a HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point is positioned in a particular geometric location within 3D space and includes one or more attributes such as color. A point cloud can be similar to a virtual object in a VR or AR environment. A mesh is another type of a virtual representation of an object in a VR or AR environment. A point cloud or a mesh can be an object, multiple objects, a virtual scene (which includes multiple objects), and the like. Point clouds and meshes are commonly used in a variety of applications, including gaming, 3D mapping, visualization, medicine, AR, VR, autonomous driving, multi-view replay, 6 DoF immersive media, to name a few. As used herein, the terms point clouds and meshes can be used interchangeably.

Point clouds represent volumetric visual data. Point clouds consist of multiple points positioned in 3D space, where each point in a 3D point cloud includes a geometric position represented by 3-tuple (X, Y, Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In certain embodiments, the points are positioned on the external surface of the object. In other embodiments, the points are positioned throughout both the internal structure and external surface of the object. In yet other embodiments, the points are positioned along the surface of the object and can be positioned within the internal area of the point cloud In addition to the geometric position of a point (the location of the point in 3D space), each point in the point cloud can also include attributes such as color, texture, reflectance, intensity, surface normal, and the like. In some embodiments, a single point of a 3D point cloud can have multiple attributes. In some applications, point clouds can also be used to approximate light field data in which, each point includes multiple view-dependent, color information (R, G, B or Y, U, V triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, an attribute that specifies the color of a single point can consume twenty-four bits. For instance, if a color component of a single point is defined based on a Red value, Green value, and Blue value, then each color component (Red, Green, and Blue) uses eight bits, totaling the twenty-four bits. As a result, a single point with a ten-bit geometric attribute data, per coordinate, and an eight-bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Video-based applications can include immersive, 360-degree video streams. 360-degree video streams can be created by tiled 360-degree videos with high resolution. For example, high-resolution can include video in 720p format or greater. The 360-degree video can be navigated using a six degree of freedom (6 DoF) device. The 6 DoF device can navigate large point clouds in the video stream. The 360-degree video streams can be applied in virtual or augmented reality (AR) for educational and entertainment purposes. For example, a user can play a game using AR to provide a more realistic experience than using a traditional gaming system or computer device.

While 360-degree video streams provide significant educational and entertainment advantages, 360-degree video streams also present various challenges. 360-degree video streams include light fields with numerous small tiles that must be arranged and buffered properly and a complicated scene graph that can include numerous objects to be traversed. Further, each of the tiled 360-degree videos, point clouds, light fields, and scene graph can be available in multiple quality/bitrate variations that each must be continuously decoded and decrypted.

In some instances, a single AR video stream can be accessed by multiple users at a single time. As in the gaming example noted above, multiple users can be immersed in a single AR environment simultaneously to accomplish a common goal. However, multiple users in a single AR environment presents several challenges. Multiple users are unlikely to always focus on the same area of the 360-degree video, resulting in multiple fields of view. Having multiple fields of view in a single 360-degree video increases the number of objects in the scene graph to traverse, which also increases the quality/bitrate variations which each need to be decoded and decrypted.

Embodiments of the present disclosure take into consideration that given the large amounts of data to be decoded for such immersive video applications, significant processing capability may be needed to provide a realistic or quality video output. Accordingly, various embodiments of the present disclosure provide for manners to reduce decoding complexity by extracting and merging relevent portions of a bitstream for a video for decoding.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 receives a 3D point cloud, decomposes the 3D point cloud to fit on 2D frames, compresses the frames to generate bitstreams. The bitstreams can be transmitted to a storage device, such as an information repository, or one or more of the client devices 106-116. For another example, one of the client devices 106-116 can receive a 3D point cloud, decompose the 3D point cloud to fit on 2D frames, compress the frames to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
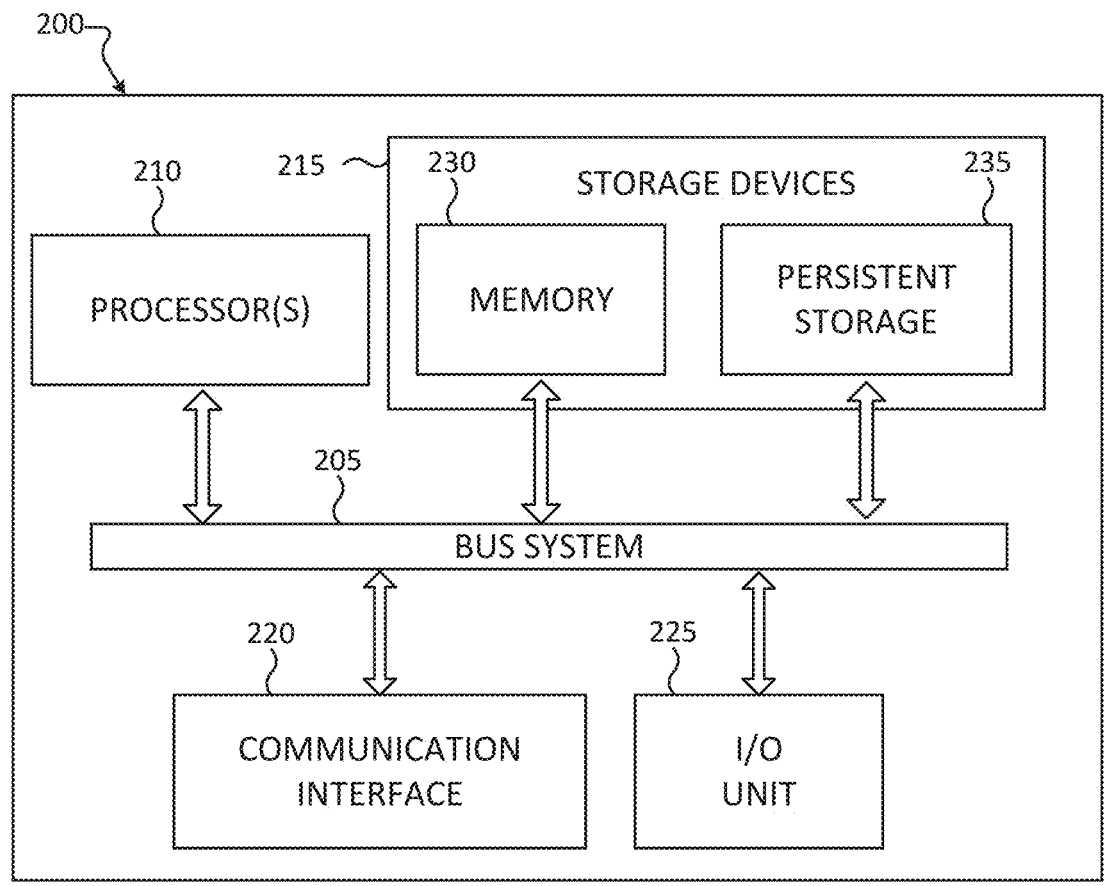
FIGS. 2 and 3 illustrate example electronic devices in accordance with an embodiment of this disclosure.
Figure 3:
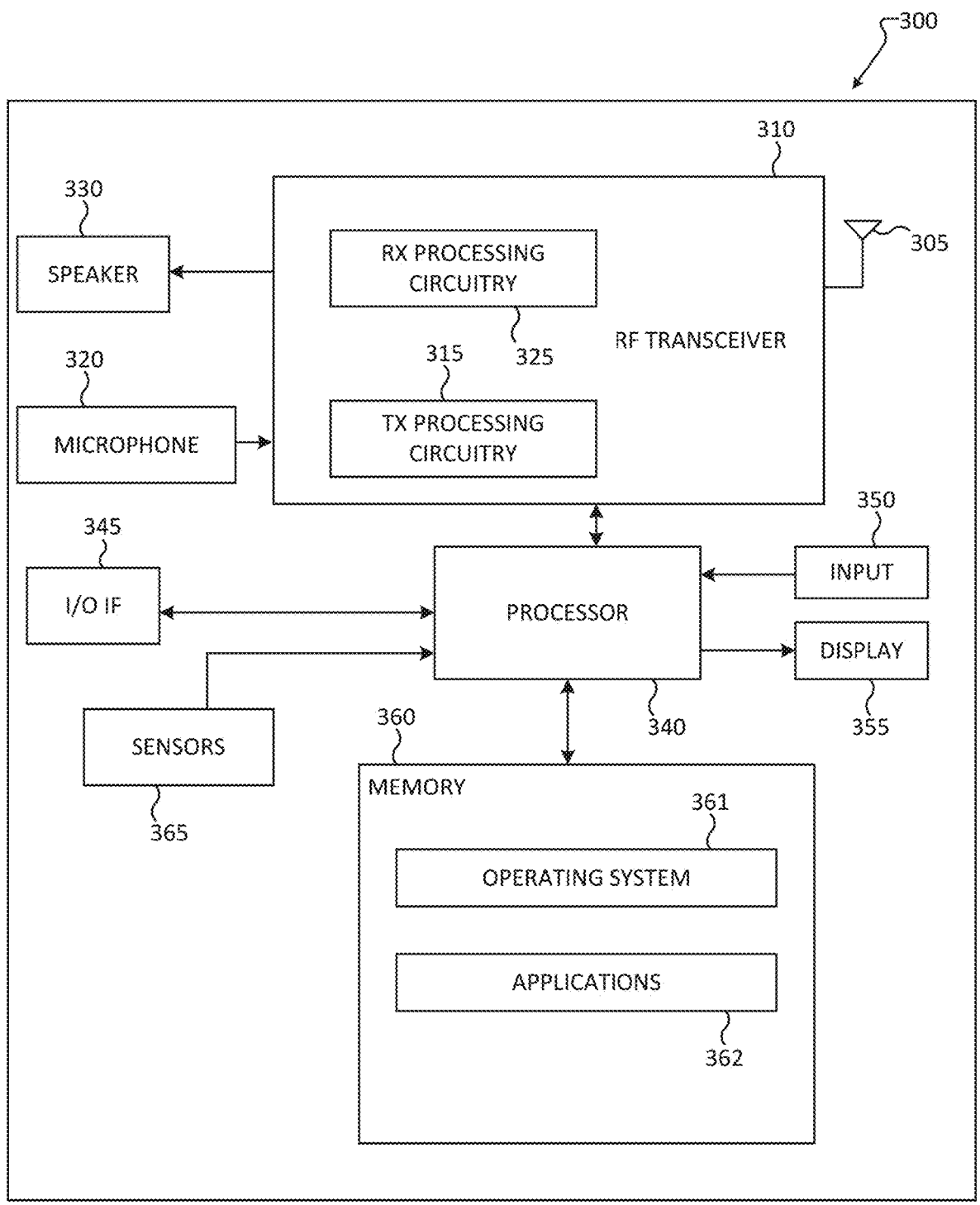

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, when the 3D point cloud is encoded by an encoder, the encoder also decodes the encoded 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image, or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a 3D point cloud or capture (or record) content through a camera. The electronic device 300 can encode the media content to generate a bitstream (similar to the server 200, described above), such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
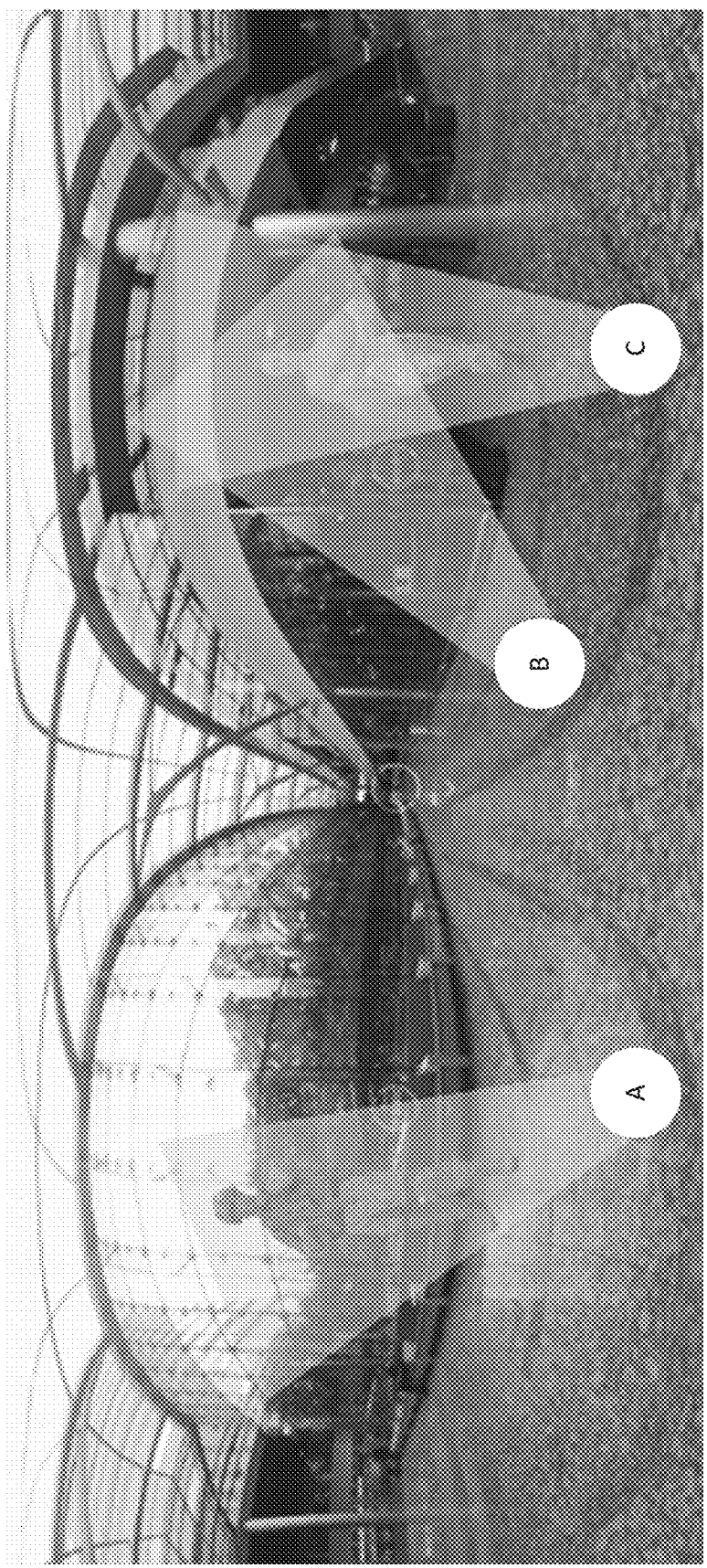
FIG. 4 illustrates an example image captured from video data according to various embodiments of the present disclosure.

FIG. 4 illustrates an example image captured from video data according to various embodiments of the present disclosure. The image illustrated in FIG. 4 is for illustration only and should not be construed as limiting.

The image illustrated in FIG. 4 is be a snapshot of a 360-degree video, or omnidirectional video, as described herein. A user that is viewing or immersed in the 360-degree video shown in FIG. 4 has six-degrees of freedom to navigate the video at any given point in time. Depending on the particular location, viewpoint, or field of view, a single user will see a combination of a portion of one or more point cloud objects and a portion of the two-dimensional video. When multiple users are viewing the 360-degree video, the points of view of each respective user can overlap or be independent.

For example, FIG. 4 illustrates the points of view of three users A, B, and C. The point of view of user A includes the front of the solder point cloud object and a portion of the two-dimensional video around the soldier. The point of view of user B includes a right side of the woman point cloud object and a portion of the two-dimensional video around the woman. The point of view of user C includes the front of the woman point cloud object and a portion of the two-dimensional video around the woman. The points of view of users B and C overlap, while the point of view of user A does not overlap either of the points of view of users B and C. Each of the users A, B, and C has a separate elementary stream to be decoded.

As shown in FIG. 4, none of the users A, B, and C see the entire 360-degree video and all the points of a point cloud object at one time. Therefore, the device, such as the HMD 116, can decode the dynamically changing portion of an encoded video bitstream for 360-degree video and the point cloud objects for more efficient processing than decoding the entire 360-degree video and all points of the point cloud objects and rendering some of the points of the point cloud objects.

The dynamically changing combination of a fraction of an elementary stream for 360-degree 2D video and some portions of each 2D video elementary streams carrying components of point cloud objects can be extracted and then combined as a single elementary stream. As new elementary stream has been constructed by the combination of multiple independently encoded elementary streams profile/level of the newly constructed elementary stream could be different from that of original elementary streams. Various methods of decoding the multiple elementary streams are possible. One method of decoding the multiple elementary streams is illustrated in FIGS. 5 and 6.

Figure 5:
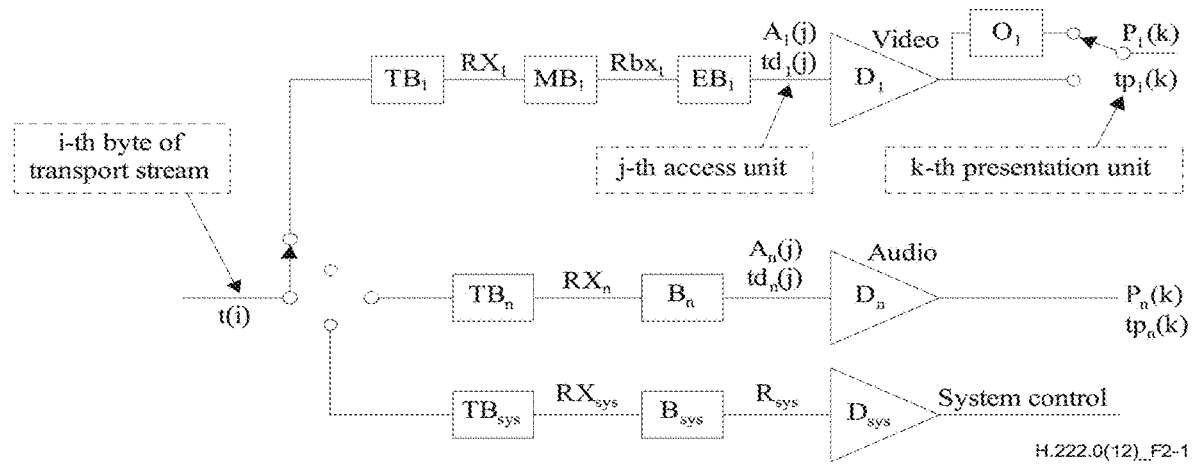
FIG. 5 illustrates a system decoder model of a MPEG-2 system which may be utilized in various embodiments of the present disclosure.
Figure 6:
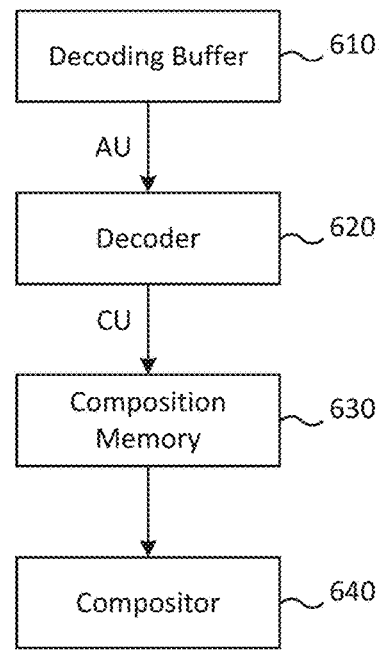
FIG. 6 illustrates a method of a MPEG-4 system decoder model which may be utilized in various embodiments of the present disclosure.

FIGS. 5 and 6 illustrate system decoder models for elementary streams according to various embodiments of the present disclosure. FIG. 5 illustrates a system decoder model of a MPEG-2 System according to various embodiments of the present disclosure. FIG. 6 illustrates a method of a system decoder model of a MPEG-4 System according to various embodiments of the present disclosure. The system decoder models illustrated in FIGS. 5 and 6 are for illustration only and should not be construed as limiting. FIGS. 5 and 6 do not limit the scope of the present disclosure to any particular structure and other embodiments can be used without departing from the scope of the present disclosure.

As shown in FIG. 5, video and audio streams can be decoded separately from one another. The decoder receives an access unit (AU) of a single elementary stream that conforms to a profile/level from the decoding buffer and generates video frames then send them to the entity for display or further processing such as composition. The video and audio are decoded separately and presented simultaneously because the bit rate is constantly maintained. The decoding buffer does not underflow or overflow and decoder can produce a picture fully occupied by the pixels generated from the received AUs. However, the model illustrated in FIG. 5 can present challenges when multiple elementary streams are provided for decoding simultaneously, such as in 360 degree video where multiple users each have a separate field of view.

FIG. 6 illustrates a method of the systems decoder model for MPEG-4 system. FIG. 6 illustrates an AU being received by the decoder 620 from the decoding buffer (DB) 610. A coding unit (CU) is received in the composition memory (CM) 630 from the decoder 620. The stream is eventually composed by the compositor 640.

The models illustrated in FIGS. 5 and 6 can be effective for decoding an elementary stream that conforms to a single profile, tier, or level by a single decoder. However, immersive environments such as the 360 degree video described herein can implement multiple elementary streams that are continuously decoded and rendered to create the video frame. Various methods are available to render the multiple streams into a video frame. In one embodiment, for when multiple streams are implemented, for example in immersive applications such as the 360 degree video shown in FIG. 4, a separate independent decoder can decode each individual elementary stream. In this embodiment, multiple independent decoders each decode a single independent elementary stream.

Figure 7:
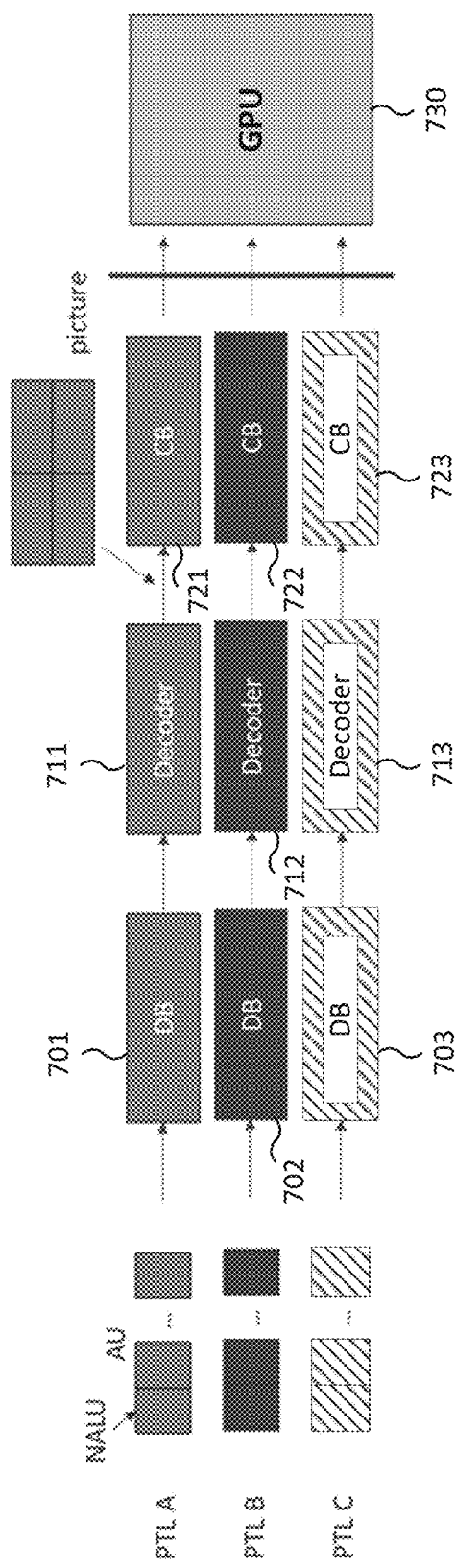
FIG. 7 illustrates a decoder model for processing multiple bitstreams.

FIG. 7 illustrates a decoder model for processing multiple bitstreams. The model illustrated in FIG. 7 is for illustration only and should not be construed as limiting. FIG. 7 does not limit the scope of the present disclosure to any particular structure and other embodiments can be used without departing from the scope of the present disclosure.

FIG. 7 illustrates three elementary streams that conform to three combinations of Profile/Tier/Level, PTL A, PTL B, and PTL C. Each stream PTL A, PTL B, and PTL C is composed of a number of network abstraction layer (NAL) units that indicate the independently coded region of a particular video frame. Similarly, as shown in FIG. 6, decoders 711, 712, 713 receives the AU of one of the elementary streams PTL A, PTL B, and PTL C, respectively, from decoding buffers 701, 702, 703, respectively. The decoders 711, 712, 713 each generate a video frame for the particular elementary stream of PTL A, PTL B, and PTL C, respectively, which are sent by the CBs 721, 722, 723, respectively, to a graphics processing unit (GPU) 730 for further processing, such as composition of the video frame. The model shown in FIG. 7 includes a separate decoding buffer and decoder for each elementary stream PTL A, PTL B, and PTL C. Because each elementary stream is decoded separately, time-locking of the generated video frames can be difficult.

The model of FIG. 7 presents additional challenges in addition to time-locking. In some embodiments, decoding resources are wasted as not all the decoded pictures are actually rendered to the user. For example, the decoded picture may not be within the field of view of the user. In some embodiments, there is no interoperability point between the content and the application as there is not a way to indicate or predict the number of parallel decoding instances supported at the content creation time. In some embodiments, there may be some variability of time consumed for frame decoding across decoder instances while the output pictures are intended to be composed into one picture for rendering. For example, even microseconds of difference between the output of the particular elementary streams can produce an imperfect output video frame. In some embodiments, frame accuracy is required for the texture of 360 degree video. Some environments, such as particular web browsers, may not allow or support the required frame accuracy. Accordingly, various embodiments of the present disclosure recognize and take into account the need for a mechanism that extracts and merges bitstreams before the streams are received by a decoding buffer.

Therefore, various embodiments of the present disclosure provide a bitstream extractor and merger (BEAMer). As described herein, the BEAMer can enhance the decoding and decryption of video files by extracting and merging the bitstreams prior to the bitstream being decoded. By extracting and merging the bitstreams prior to the bitstream being decoded, immersive environments using 360 degree video can be generated efficiently and accurately.

Figure 8:
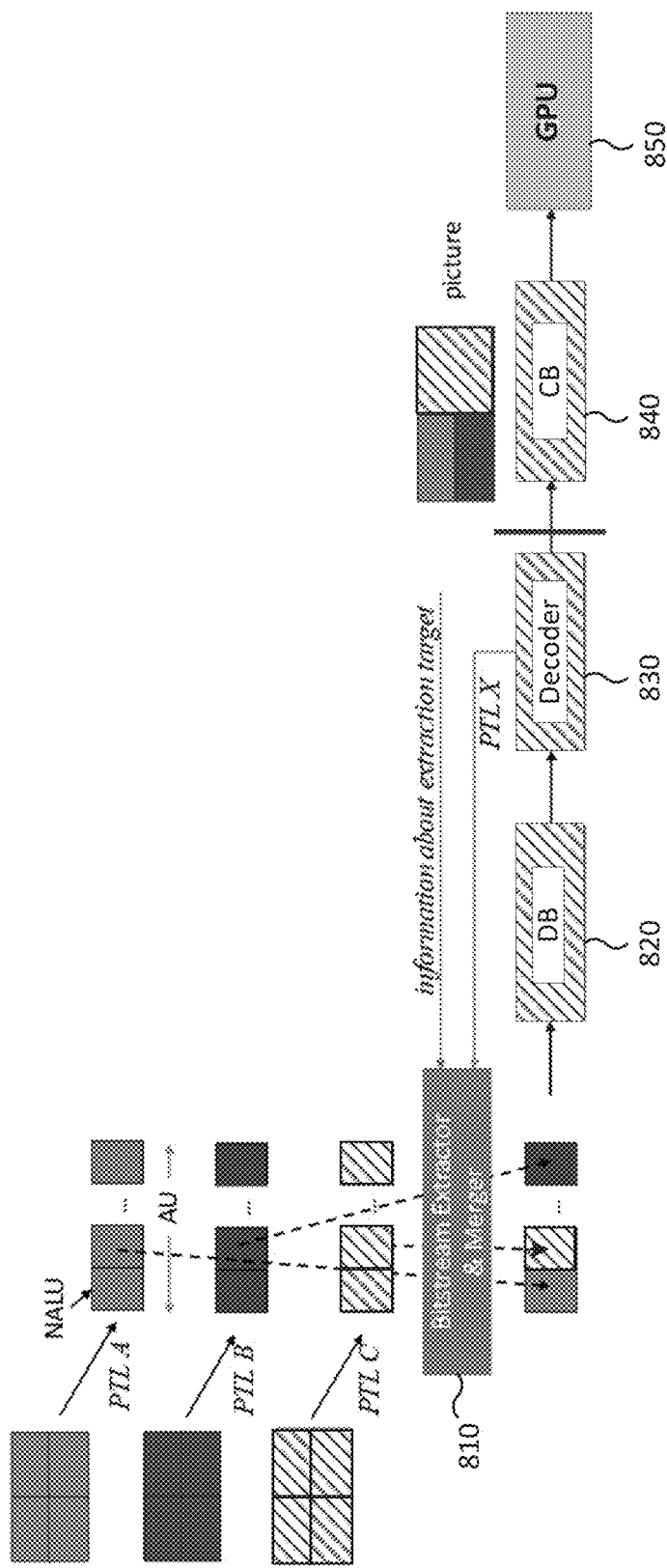
FIG. 8 illustrates a system decoder model for immersive media according to various embodiments of the present disclosure.

FIG. 8 illustrates a system decoder model according to various embodiments of the present disclosure. The model illustrated in FIG. 8 is for illustration only and should not be construed as limiting. FIG. 8 does not limit the scope of the present disclosure to any particular structure and other embodiments can be used without departing from the scope of the present disclosure. As described herein, the system decoder model illustrated in FIG. 8 can enhance the decoding and decryption of video files.

FIG. 8 illustrates three elementary streams that conform to Profile/Tier/Level combinations PTL A, PTL B, and PTL C. Each of PTL A, PTL B, and PTL C are generated by an encoder. The encoder can be housed in a server such as server 200. Each elementary stream is composed of a number of NAL units which indicate independently coded regions of a video frame. As shown in FIG. 8, the video frames of the three streams PTL A, PTL B, and PTL C can be divided into four equal size regions. Although described herein as divided into four equal size regions, various embodiments are possible, and the streams can be divided into more or fewer than four equal size regions. Each of the regions are encoded separately as an independently coded region and are carried by separate NAL units.

In some embodiments, a BEAMer 810 can be provided before the decoding buffer 820. In various embodiments, an interface can be provided between the decoder 830 and the BEAMer 810 to indicate the particular PTL the decoder 830 conforms to. For example, the interface can be a part of the decoding buffer 820 or separate from the decoding buffer 820. Based on the indicated PTL by the interface, the BEAMer 810 can receive target information that indicates the portion of elementary streams to extract from the bitstreams PTL A, PTL B, and PTL C. In various embodiments, the target information can include information or details regarding the portion of the video frame to be generated. The target information can include location information of the target area, size information of the target area, a number of coded picture data bits of the coded region, and a number of luma samples in the coded region.

Based on the received target information, the BEAMer 810 identifies information about each independently coded region in each of the bitstreams PTL A, PTL B, and PTL C based on the NAL unit of each particular bitstream. For example, the information about each independently coded region in each of the bitstreams PTL A, PTL B, and PTL C can include location information and size information of each independently encoded region within the 360 degree video. For example, the information in the NAL units header can include a number of luma samples in the independent coded region, a number of coded picture data bits of the independent coded region, parameters to calculate fullness of hypothetical reference decoder model, and the location information and size information of independent coded region.

The location information and size information can correspond to the particular field of view of each user. For example, each elementary stream can represent a field of view of a user. For example, as applied in the image in FIG. 4, a first elementary stream can represent the field of view of user A, a second elementary stream can represent the field of view of user B, and a third elementary stream can represent the field of view of user C. Based on these fields of view represented in the elementary streams, the BEAMer 810 can determine the rendered video frame will include the front side of the soldier, the front side of the woman, and the right side of the woman, but may not need to include the rear of the soldier, the rear of the woman, the left side of the woman, or the area between the soldier and the woman. Because none of the users A, B, or C are currently viewing these areas, the video frame that will be rendered using the particular elementary streams may not update these areas so the decoding process can be performed more efficiently. Specifically, the resources used to decode the merged bitstream can be reduced.

The hypothetical reference decoder model is a model of the capacity of the decoder 830 at a particular point in time. In some embodiments, the capacity of the decoder 830 can vary from frame to frame. The capacity can vary based on several factors, including the other programs currently being operated in the particular electronic device. By receiving the parameters in the NAL units header, the BEAMer 810 can calculate the capacity of the decoding buffer 820 and the decoder 830 in order to manage a fullness of the decoding buffer 820 and the decoder 830 and provide a merged bitstream that does not require a capacity to decode that is greater than the actual or estimated capacity of the decoder 830 for the specific bitstream. In some embodiments, the parameters can include information regarding the size of the bitstream file to be decoded and information regarding other applications 362 being executed by the memory 360, current operations being executed by the operating system 361, and current functions being executed by the processor 340.

In some embodiments, the BEAMer 810 can identify information regarding a region of interest in the 360 degree video based on the information identified from the independently coded regions of the NAL unit's header. In other embodiments, the BEAMer 810 can receive the region of interest from the HMD 116. The region of interest corresponds to a field of view of the display 355 of the HMD 116. In the example described above regarding FIG. 4, based on the point of view of the users A, B, and C, the BEAMer 810 can identify the front side of the soldier, the front side of the woman, and the right side of the woman as regions of interest. In some embodiments, the regions of interest can be identified based on information obtained from the one or more sensors 365, such as a gyroscope or accelerometer, located on the HMD 116. The processor 340 can analyze the information obtained from the one or more sensors 365 to determine an angle and direction of the field of view of the display 355 and analyze the field of view to determine the region of interest.

Based on the identified regions of interest in the 360 degree video, the BEAMer 810 can select the independently coded regions, identified in the NAL units header, in each of the bitstreams PTL A, PTL B, and PTL C that correspond to the identified regions of interest. Then, the BEAMer 810 can extract the portions of the bitstreams from each bitstream PTL A, PTL B, and PTL C to be used for the video frame. Using the extracted portions of each bitstream PTL A, PTL B, and PTL C, the BEAMer 810 creates, or generates, one or more new elementary streams PTL X by, in various embodiments, merging the extracted portions of the bitstreams PTL A, PTL B, and PTL C. In other embodiments, the BEAMer may generate separate streams for the extracted portions of the bitstreams PTL A, PTL B, and PTL C without merging into a single bitstream. The new elementary stream PTL X can be sent to the decoding buffer 820 and then on to the decoder 830. The decoder 830 processes, or decodes, the bitstream PTL X. The CB 840 generates a coded picture that is a combination of independently coded regions selected by the BEAMer 810. By combining independently coded regions from separate bitstreams PTL A, PTL B, and PTL C, the GPU 850 can generate a synchronized single picture from the coded picture.

In various embodiments, the BEAMer 810 receives PTL information from the decoder 830 about PTL parameters being used by the decoder 830 to decode the PTL X bitstream and generate the bitstream to conform to the PTL parameters used by the decoder 830. For example, as shown in FIG. 8, the generated picture includes portions of each of the bitstreams PTL A, PTL B, and PTL C. In the diagrammed picture shown in FIG. 8, a portion of PTL A is used in the upper left corner of the picture, a portion of PTL B is used in the lower left corner of the picture, and a portion of PTL C is used in the right half of the corner. However, the generated picture shown in FIG. 8 is provided as an example only and should not be construed as limiting.

In some embodiments, the elementary stream PTL X is a newly generated bitstream separate from each of the bitstreams PTL A, PTL B, and PTL C. In other embodiments, the elementary stream PTL X can be a modified one of the bitstreams PTL A, PTL B, and PTL C. For example, if the video frame includes a high proportion of portions of PTL A, the elementary stream PTL X can be a modified PTL A stream to incorporate some elements of bitstreams PTL B and PTL C. Additionally, while 3 bitstreams are discussed as having regions being extracted, this number is an example, and any number of bitstream regions may be extracted and/or merged in embodiments of the present disclosure.

Generating a new elementary stream PTL X provides a more focused decoding and picture generation. By receiving target information indicating the relevant portions of a stream for a particular video frame, the decoder can decode the portions of the stream that are relevant while minimizing the portions of multiple streams that may not be needed for the particular video frame. This minimizes the resources necessary for the decoding operation and results in a more streamlined decoding operation that reduces waste.

The new elementary stream PTL X generated by the BEAMer 810 conforms to the PTL combination of the decoder 830. Accordingly, the BEAMer 810 performs one or more of several operations to determine the new elementary stream PTL X conforms to the PTL combination of the decoder 830. For example, the BEAMer 810 calculates luma sample rates of the generated elementary stream and verifies the value is smaller than the maximum specified by the PTL combination of the decoder 830. The BEAMer 810 further calculates the bit rate of the generated elementary stream and verifies the value is smaller than the maximum specified by the PTL combination of the decoder 830. The BEAMer 810 further calculates the fullness of the hypothetical reference decoder model and ensure the decoding buffer 820 does not overflow. The BEAMer 810 further reads the location information and the size information of the independently coded region of the extracted data and modifies the value based on the location information and size information to avoid overlap of information.

In order for the BEAMer 810 to perform the above-identified operations, the BEAMer 810 receives key information from the NAL unit's header of each elementary stream.

In various embodiments, the BEAMer 810 can be physically disposed in a variety of locations. For example, the BEAMer 810 can be disposed on server 104 that transmits the rendered video image to an HMD 116. As another example, the BEAMer 810 can be located in the electronic device 300 that is decoding and rendering the video. In these embodiments, the BEAMer 810 can be located on the electronic device 300 and locally transmit the extracted and merged bitstream to the decoder 830. In some embodiments, the BEAMer 810 can be a feature of the decoder 830, as described below in the description of FIG. 10.

Figure 9:
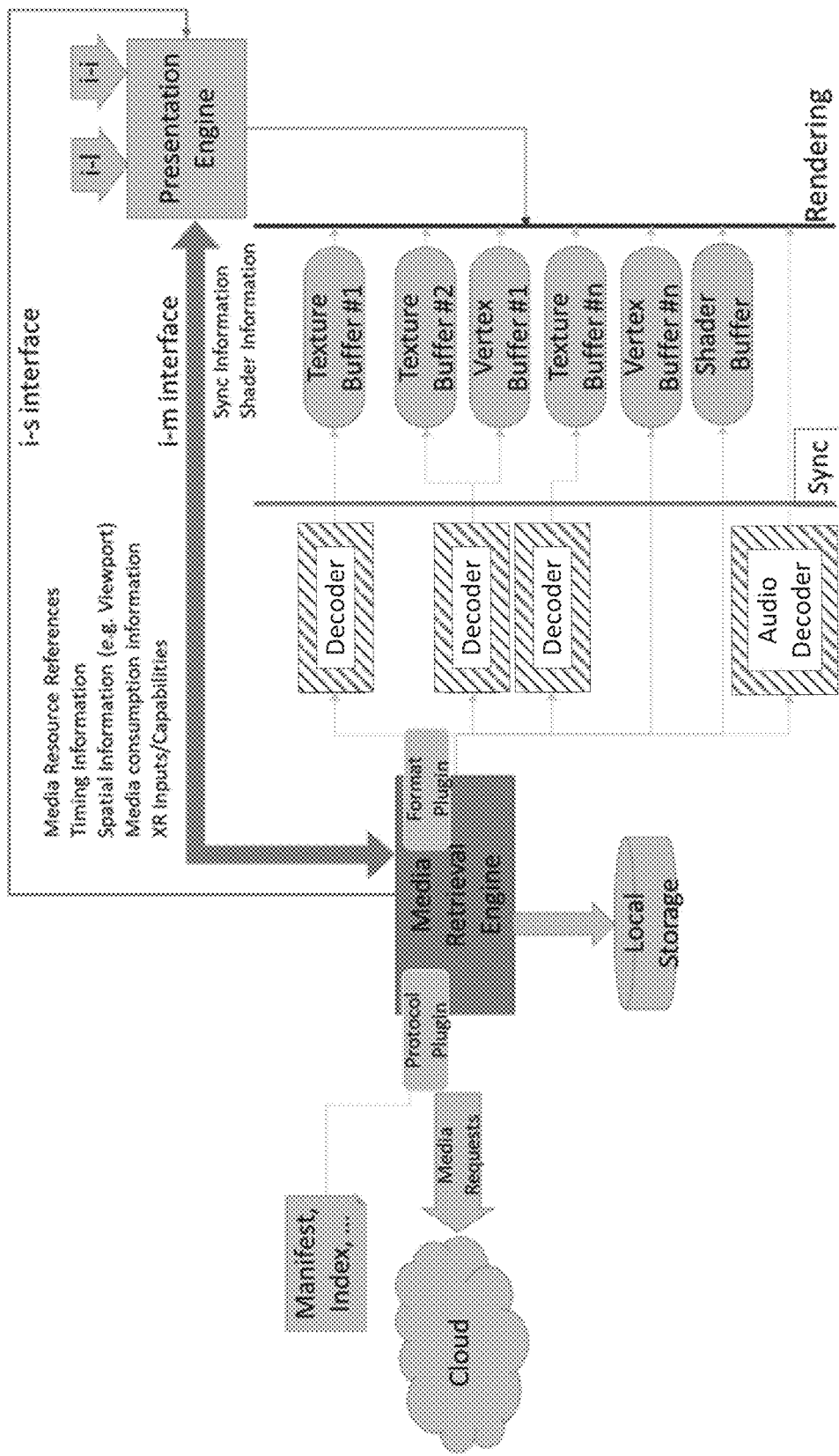
FIG. 9 illustrates an MPEG architecture which may be utilized in various embodiments of the present disclosure.

FIG. 9 illustrates an MPEG-I architecture which may be utilized in various embodiments of the present disclosure. The architecture illustrated in FIG. 9 is for illustration only and should not be construed as limiting. FIG. 9 does not limit the scope of the present disclosure to any particular structure and other embodiments can be used without departing from the scope of the present disclosure.

The MPEG-I architecture shown in FIG. 9 can be specified in both N18344 and N18357. The i-s interface is the interface to the scene description and the i-m interface is the interface to the media. The BEAMer 810 as illustrated in FIG. 8 can be applied to the architecture illustrated in FIG. 9. For example, the BEAMer 810 can be disposed within a media retrieval engine. The information used to calculate the target media data to be extracted can be known from the presentation engine.

The media retrieval engine can identify the data to be extracted from each elementary stream by using the timing information and spatial information such as viewport of the user. Then, by using the BEAMer, the media retrieval engine can extract the identified portion and create a new elementary stream. The media retrieval engine can use data declaration metadata for identifying objects and object fragments according to various contexts such as temporal, spatial, and quality. In other words, the declaration metadata can provide correspondence between the portion of the elementary stream and the objects. Object fragments of the scene can be provided to the media retrieval engine so the engine can identify the target data to be extracted according to the information received from the presentation engine.

By utilizing the BEAMer, the media retrieval engine can extract the data from each elementary stream. The extracted data can be transmitted locally to a local storage or externally from the device through the cloud, such as network 102. The extracted data can further be transmitted to one or more decoders that are disposed either locally on the same device as the media retrieval engine or externally such as on server 104. The decoders can include both video decoders and audio decoders. The decoded stream, or multiple streams, can be synced and transmitted to the texture buffer for rendering and presentation in the presentation engine.

Figure 10:
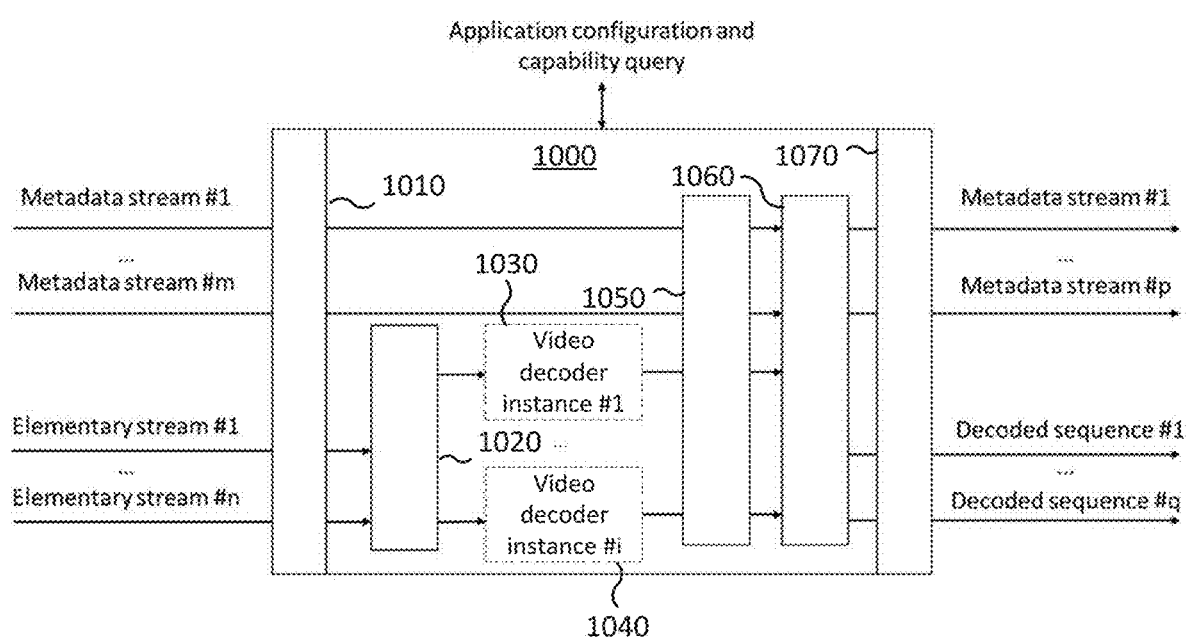
FIG. 10 illustrates an example decoding interface for immersive media according to various embodiments of the present disclosure.

FIG. 10 illustrates an example decoding interface for immersive media according to various embodiments of the present disclosure. The interface illustrated in FIG. 10 is for illustration only and should not be construed as limiting. FIG. 10 does not limit the scope of the present disclosure to any particular structure and other embodiments can be used without departing from the scope of the present disclosure.

FIG. 10 illustrates a video decoding engine 1000 according to various embodiments of the present disclosure. In some embodiments, the video decoding engine 1000 can be the decoder 830. In various embodiments, the video decoding engine 1000 can be physically disposed in a client device such as the HMD 116.

The video decoding engine 1000 includes an input video decoding interface 1010 and an output video decoding interface 1070. The input video decoding interface 1010 can receive both metadata streams, such as metadata streams #1 through #m, and elementary streams, such as elementary streams #1 through #n. The input video decoding interface can receive any number of metadata streams and elementary streams and the two metadata streams and two elementary streams illustrated in FIG. 10 should not be construed as limiting.

In the video decoding engine 1000, input formatting 1020 is performed on the elementary streams. After the input formatting 1020, each elementary stream is decoded in a video decoder instance. For example, the elementary stream #1 is decoded by a video decoder instance #1 1030 and the elementary stream #n is decoded by a video decoder instance #i 1040. As shown in FIG. 10, the metadata streams may not go through the input formatting and video decoder instance. The metadata streams can progress directly to time locking.

After the elementary streams pass through the video decoder instances, the video decoding engine 1000 performs time locking 1050 on each of the elementary streams and the metadata streams. Time locking synchronizes each individual stream in time. After the time locking, the video decoding engine 1000 performs output formatting 1060 on each stream. Once each stream has been formatted, the output video decoding interface 1070 outputs the formatted metadata streams and a decoded sequence corresponding to each elementary stream. For example, the metadata streams #1 and #m are output as metadata streams #1 and #p, respectively while the elementary streams #1 and #n are output as decoded sequence #1 and #q, respectively.

In various embodiments, the video decoding engine 1000 can include the BEAMer 810. For example, the BEAMer 810 can be provided in the video decoding engine 1000 such that the elementary streams #1 through #n are extracted and merged before the time locking. In this example, the decoded sequences #1 through #n are output as a merged decoded sequence rather than separate sequences. Accordingly, the BEAMer 810 can be located between the input video decoding interface 1010 and the input formatting 1020, or between the input formatting 1020 and the video decoder instance 1030, 1040.

Figure 11:
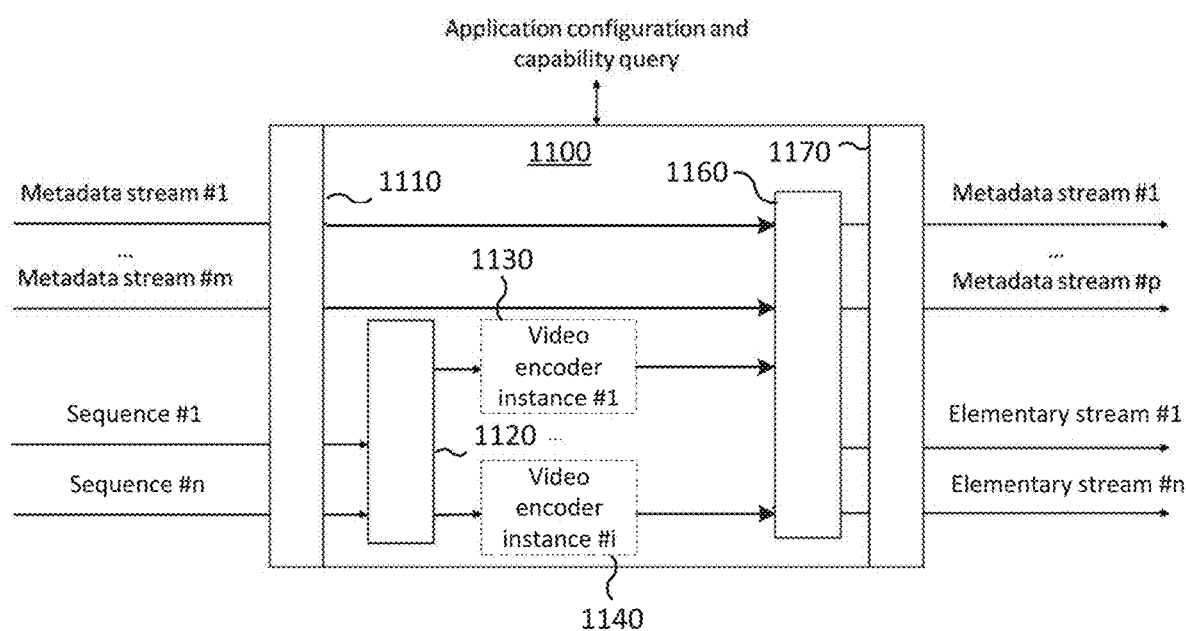
FIG. 11 illustrates an example encoding interface for immersive media according to various embodiments of the present disclosure.

FIG. 11 illustrates an example encoding interface for immersive media according to various embodiments of the present disclosure. The interface illustrated in FIG. 11 is for illustration only and should not be construed as limiting. FIG. 11 does not limit the scope of the present disclosure to any particular structure and other embodiments can be used without departing from the scope of the present disclosure.

The video encoding engine 1100 can be complementary to the video decoding engine 1000 illustrated in FIG. 10. For example, the video encoding engine 1100 may be located in a server such as server 104. The video encoding engine 1100 includes an input video encoding interface 1110 and an output video encoding interface 1170. The input video encoding interface 1110 can receive both metadata streams, such as metadata streams #1 through #m, and sequences, such as sequences #1 through #n. The input video encoding interface can receive any number of metadata streams and sequences and the two metadata streams and two sequences illustrated in FIG. 11 should not be construed as limiting.

In the video encoding engine 1100, input formatting 1120 is performed on the sequences. After the input formatting 1120, each sequence is encoded in a video encoder instance. For example, the sequence #1 is encoded by a video encoder instance #1 1130 and the sequence #n is encoded by a video encoder instance #i 1140. As shown in FIG. 11, the metadata streams may not go through the input formatting and video encoder instance. The metadata streams can progress directly to the output formatting.

After the elementary streams pass through the video decoder instances, the video encoding engine 1100 performs output formatting 1160 on each stream. The output formatting converts the sequences #1 through #n into elementary streams #1 through #n. Once each stream has been formatted, the output video decoding interface 1170 outputs the formatted metadata streams and an elementary stream corresponding to each sequence. For example, the metadata streams #1 and #m are output as metadata streams #1 and #p, respectively while the sequences #1 and #n are output as elementary streams #1 and #n, respectively.

As described herein, streams and sequences can be encoded by the video encoding engine 1100 before being decoded by the video decoding engine 1000. In some embodiments, the video encoding engine 1100 can be disposed in the server 104. The server can transmit the metadata streams #1 through #p and elementary streams #1 through #n to a client device, such as the HMD 116. The BEAMer disposed on the HMD 116 can extract and merge the streams as described herein and output the merged stream to the video decoding engine 1000, disposed on the HMD 116 to decode the stream or streams. In other embodiments, both the video encoding engine 1100 and the video decoding engine 1000 can be disposed in the same device, such as the HMD 116. In these embodiments, the transmission from the video encoding engine 1100 to the BEAMer 810 to the video decoding engine 1000 can be an internal transmission and performed by a single device.

Figure 12:
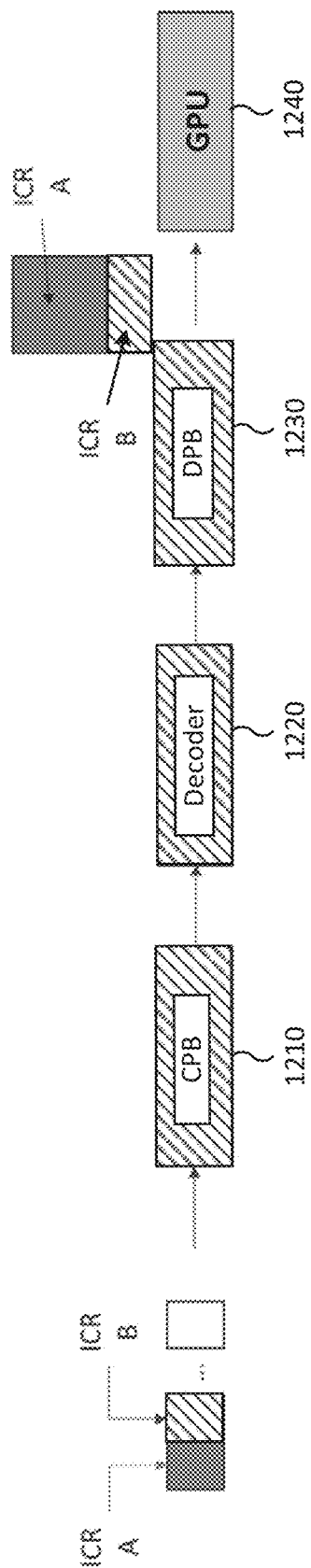
FIG. 12 illustrates a model for a bitstream extractor and merger (BEAMer) according to various embodiments of the present disclosure.

FIG. 12 illustrates a model for a bitstream extractor and merger (BEAMer), such as, for example, the BEAMer 810 in FIG. 8, according to various embodiments of the present disclosure. The model illustrated in FIG. 12 is for illustration only and should not be construed as limiting. FIG. 12 does not limit the scope of the present disclosure to any particular structure and other embodiments can be used without departing from the scope of the present disclosure.

In some embodiments, a single AU can have more than one independently encoded region (ICR). Each region can be encoded with various coding technologies such as sub-pictures, motion constrained tile sets, slices, and tile groups. The decoded results of ICRs can be independently used for the composition, rendering, and display by a GPU. A single AU results in a single picture with a combination of the regions.

For example, FIG. 12 illustrates a portion of an AU bitstream corresponding to ICR A and another portion of the AU bitstream corresponding to ICR B. The bitstream corresponding to ICR A results in an upper part of the picture and the bitstream corresponding to ICR B results in lower part of the picture. The bitstream contains multiple ICRs and has a list of identified (IDed) independently coded regions as well as size and location information of each region in the output picture. Within a single video sequence, the size and location information of each independently coded regions associated with a particular ID are not modified. New sequence parameter sets (SPSs) can be sent to change location and size information of ICRs associated with a particular ID. In some embodiments, a list of ICRs is carried in a separate NAL unit, which does not have include coded data of video or parameter sets for efficient extraction and use by various systems.

A BEAMer, such as the BEAMer 810, can dynamically map different parts of bitstreams encoded as motion constrained tile sets, slices, and tile groups to each ICR. For example, an original bitstream can be encoded with nine parts, three in horizontal and three in vertical, and two information for two ICRs. For each video frame, the BEAMer 810 dynamically selects six parts among the nine parts and generates a bitstream with one region with four parts and another with two parts. When the BEAMer 810 rewrites the bitstream, the parameter sets such as SPS, VPS, PPS and so on are modified based on the selected parts for generated bitstream. In addition, the BEAMer 810 can also update the information regarding which region has which parts.

The extracted and merged bitstreams can be passed through the decoding buffer, or coded picture buffer (CPB), 1210, the decoder 1220, the coding buffer, or decoded picture buffer (DPB), 1230, and then used for composition, rendering, and display by the GPU 1240. In so doing, a single AU can result in a single picture with the combination of regions.

Figure 13:
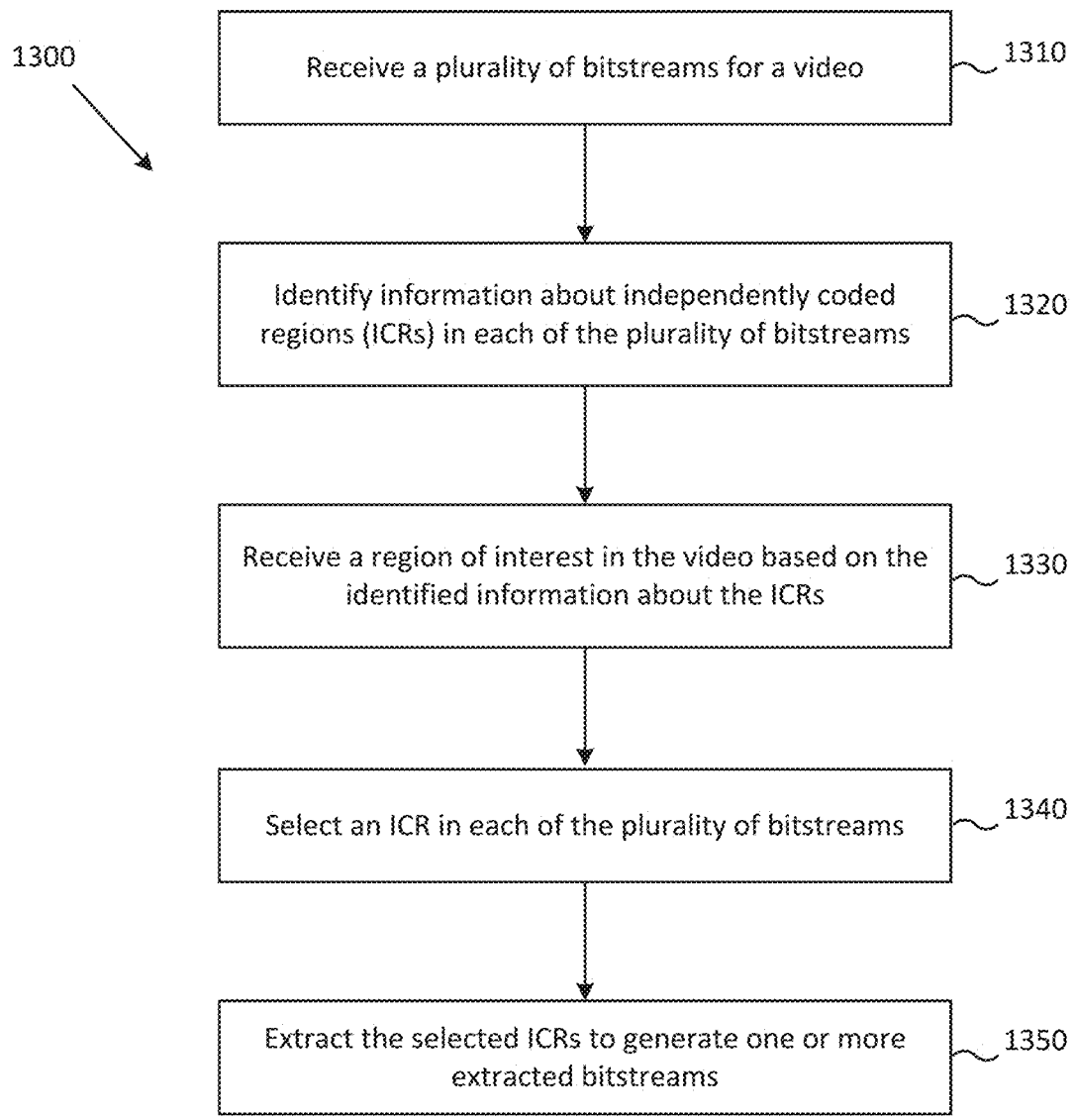
FIG. 13 illustrates a method of extracting and merging bitstreams according to various embodiments of the present disclosure.

FIG. 13 illustrates a method of extracting and merging bitstreams according to various embodiments of the present disclosure. The method 1300 illustrated in FIG. 13 can be implemented by the electronic devices 200 or 300 referred hereto collectively as "the system". Other embodiments can be used without departing from the scope of the present disclosure. As described herein, the method 1300 can enhance the decoding and decryption of video files.

In operation 1310, the system receives a plurality of bitstreams for a video. The bitstreams can be transmitted internally within the electronic device 300 or received from an external source, such as the server 104.

In operation 1320, the system identifies information about independently coded regions (ICRs) in each of the received plurality of bitstreams. The system can identify the information from one or more NAL units that are received in the plurality of bitstreams.

In operation 1330, the system receives a region of interest in the video based on the identified information about the ICRs. In operation 1340, based on the identified information, the system selects a particular ICR in each of the plurality of bitstreams that corresponds to the region of interest. In operation 1350, the system extracts the selected ICRs to generate one or more extracted bitstreams.

In some embodiments, the information about the independently coded regions is identified from one or more network abstract layer (NAL) units received in the plurality of bitstreams. In some embodiments, the information about the independently coded regions includes information about a size of each of the independently encoded regions and a location of each of the independently encoded regions within the video and the independently coded regions to extract and merge into the merged bitstream that includes the region of interest is determined based on the information about the size and the location.

In some embodiments, parameters are received, from a decoder, regarding a capacity of the decoder that decodes the received bitstream and the independently coded regions to extract and merge into the merged bitstream are selected based on the parameters to manage fullness of the decoder. In some embodiments, information is received, from a decoder, about PTL parameters of the decoder and the one or more extracted bitstreams are generated to conform to the PTL parameters of the decoder.

In some embodiments, the information about the independently coded regions includes at least one of a number of luma samples in each of the identified independently coded regions or a number of coded data bits in each of the identified independently coded regions.

In some embodiments, the merged bitstream is transmitted to an external decoder for decoding and rendering of the video. In some embodiments, the merged bitstream is decoded for rendering as the video.

In some embodiments, the region of interest corresponds to a field of view of a display of the apparatus. In some embodiments, the region of interest is determined based on inputs received from one or more sensors associated with the display.

Although the present disclosure has been described with an example embodiment, various changes and modifications can be suggested by or to one skilled in the art. It is intended that the present disclosure encompass such changes and modifications as fall within the scope of the appended claims.

What is claimed is:

1. An apparatus comprising:
a communication interface configured to receive a plurality of bitstreams for a video; and
a processor operably connected to the communication interface, the processor configured to:
identify information about independently coded regions in each of the plurality of bitstreams,
receive information regarding a relevant region in the video,
receive parameters regarding a capacity of a decoder for the video,
receive information about profile, tier, and level (PTL) parameters of the decoder,
extract one or more independently coded regions in each of the plurality of bitstreams based on the identified information for the one or more independently coded regions corresponding to the relevant region required by an application of the decoder and based on the parameters regarding the capacity of the decoder to manage a fullness of the decoder, and
generate one or more extracted bitstreams with the extracted one or more independently coded regions to conform to the PTL parameters of the decoder.

2. The apparatus of claim 1, wherein the processor is further configured to identify the information about the independently coded regions from one or more network abstract layer (NAL) units received in the plurality of bitstreams.

3. The apparatus of claim 1, wherein:
the information about the independently coded regions includes information about a size of each of the independently coded regions and a location of each of the independently coded regions within the video, and
the processor is further configured to determine the independently coded regions to extract that include the relevant region based on the information about the size and the location.

4. The apparatus of claim 1, wherein the
parameters regarding the capacity of the decoder that decodes the one or more extracted bitstreams are received from the decoder.

5. The apparatus of claim 1, wherein the
information about the PTL parameters of the decoder is received from the decoder.

6. The apparatus of claim 1, wherein the information about the independently coded regions includes at least one of:
a number of luma samples in each of the identified independently coded regions, and
a number of coded data bits in each of the identified independently coded regions.

7. The apparatus of claim 1, wherein the communication interface is further configured to transmit the one or more extracted bitstreams to an external decoder for decoding and rendering of the video.

8. The apparatus of claim 1, further comprising the decoder configured to decode the one or more extracted bitstreams for rendering as the video.

9. The apparatus of claim 1, further comprising:
a display,
wherein the relevant region corresponds to a field of view of the display, and
wherein the information regarding the relevant region is received based on inputs from one or more sensors associated with the display.

10. A method performed by an apparatus, the method comprising:
receiving a plurality of bitstreams for a video;
identifying information about independently coded regions in each of the plurality of bitstreams;
receiving information regarding a relevant region in the video;
receiving parameters regarding a capacity of a decoder for the video,
receiving information about profile, tier, and level (PTL) parameters of the decoder,
extracting one or more independently coded regions in each of the plurality of bitstreams based on the identified information for the one or more independently coded regions corresponding to the relevant region required by an application of the decoder and based on the parameters regarding the capacity of the decoder to manage a fullness of the decoder; and
generating one or more extracted bitstreams with the extracted one or more independently coded regions to conform to the PTL parameters of the decoder.

11. The method of claim 10, further comprising identifying the information about the independently coded regions from one or more network abstract layer (NAL) units received in the plurality of bitstreams.

12. The method of claim 10, wherein:
the information about the independently coded regions includes information about a size of each of the independently coded regions and a location of each of the independently coded regions within the video, and
the method further comprises determining the independently coded regions to extract that include the relevant region based on the information about the size and the location.

13. The method of claim 10, wherein the
parameters regarding the capacity of the decoder that decodes the one or more extracted bitstreams are received from the decoder.

14. The method of claim 10, wherein the further comprising:
information about the PTL parameters of the decoder is received from the decoder.

15. The method of claim 10, wherein the information about the independently coded regions includes at least one of:
a number of luma samples in each of the identified independently coded regions, and
a number of coded data bits in each of the identified independently coded regions.

16. The method of claim 10, further comprising transmitting the one or more extracted bitstreams to an external decoder for decoding and rendering of the video.

17. The method of claim 10, further comprising decoding, by the apparatus, the one or more extracted bitstreams for rendering as the video at the apparatus.

18. The method of claim 10, wherein:
the relevant region corresponds to a field of view of a display of the apparatus, and
the information regarding the relevant region is received based on inputs from one or more sensors associated with the display.

19. An apparatus comprising:
a processor configured to:
independently encode regions of a video in each of a plurality of bitstreams for the video, and
include information about the independently encoded regions in one or more network abstract layer (NAL) units in the plurality of bitstreams, the information about the independently encoded regions including information about a size of each of the independently encoded regions and a location of each of the independently encoded regions within the video, wherein the information includes profile, tier, and level (PTL) parameters of the one or more independently coded regions in each of the plurality of bitstreams; and
a communication interface configured to transmit the plurality of bitstreams.

20. The apparatus of claim 19, wherein the information about the independently encoded regions further includes at least one of:
a number of luma samples in each of the independently encoded regions, and
a number of coded picture data bits in each of the independently encoded regions.

\* \* \* \* \*